United States Patent
Chatterjee et al.

(10) Patent No.: US 7,891,290 B1
(45) Date of Patent: Feb. 22, 2011

(54) MACHINE FOR MAKING DAIRY PRODUCTS

(75) Inventors: Chinmay Chatterjee, Westwood, MA (US); Nilu Prasad Chatterjee, Westwood, MA (US)

(73) Assignee: Integrated Pharmaceuticals, Inc., Fitchburg, MA (US)

( * ) Notice: Subject to any disclaimer, the term of this patent is extended or adjusted under 35 U.S.C. 154(b) by 1329 days.

(21) Appl. No.: 11/404,574

(22) Filed: Apr. 14, 2006

Related U.S. Application Data

(63) Continuation-in-part of application No. 11/296,189, filed on Dec. 6, 2005, now abandoned.

(60) Provisional application No. 60/633,504, filed on Dec. 6, 2004, provisional application No. 60/673,154, filed on Apr. 20, 2005, provisional application No. 60/703,960, filed on Jul. 29, 2005.

(51) Int. Cl.
A47J 27/00 (2006.01)
A23G 9/00 (2006.01)

(52) U.S. Cl. ............... 99/453; 99/452; 99/455; 99/470; 99/483; 62/60; 62/159; 62/340; 62/344; 222/146.1

(58) Field of Classification Search ........... 99/452, 99/453, 455, 468, 470, 483; 62/60, 132, 62/159, 340, 344; 222/146.1, 146.2, 146.6
See application file for complete search history.

(56) References Cited

U.S. PATENT DOCUMENTS

| | | | |
|---|---|---|---|
| 4,959,229 A | 9/1990 | Reddy et al. | 426/39 |
| 4,992,291 A | 2/1991 | Yamamoto | 426/573 |
| 5,054,383 A * | 10/1991 | Cho | 99/327 |
| 5,327,818 A * | 7/1994 | Olivetti | 99/455 |
| 6,012,383 A * | 1/2000 | Lande' | 99/453 |
| 6,171,633 B1 | 1/2001 | Dulebohn et al. | 426/580 |
| 7,401,546 B2 * | 7/2008 | Dumm | 99/470 |
| 7,640,755 B1 * | 1/2010 | Kateman | 62/60 |
| 7,651,008 B2 * | 1/2010 | Sher et al. | 222/129.1 |
| 2003/0085237 A1 * | 5/2003 | Kateman et al. | 222/1 |
| 2004/0180128 A1 | 9/2004 | Takebe et al. | 426/629 |
| 2004/0224069 A1 * | 11/2004 | Aird et al. | 426/582 |
| 2005/0244543 A1 | 11/2005 | Takaichi et al. | 426/74 |
| 2005/0260322 A1 | 11/2005 | Takaichi et al. | 426/573 |

* cited by examiner

*Primary Examiner*—Reginald L Alexander
(74) *Attorney, Agent, or Firm*—Sunstein Kann Murphy & Timbers LLP

(57) ABSTRACT

A machine for making yoghurt without requiring active bacterial cultures includes a milk dispenser, an ingredient dispenser, a heating unit and a cooling unit. In particular, a vending machine further includes a credit entry component. The ingredient dispenser system releases at least one salt of a non-toxic divalent cation and at least one non-toxic acidulating agent.

36 Claims, 3 Drawing Sheets

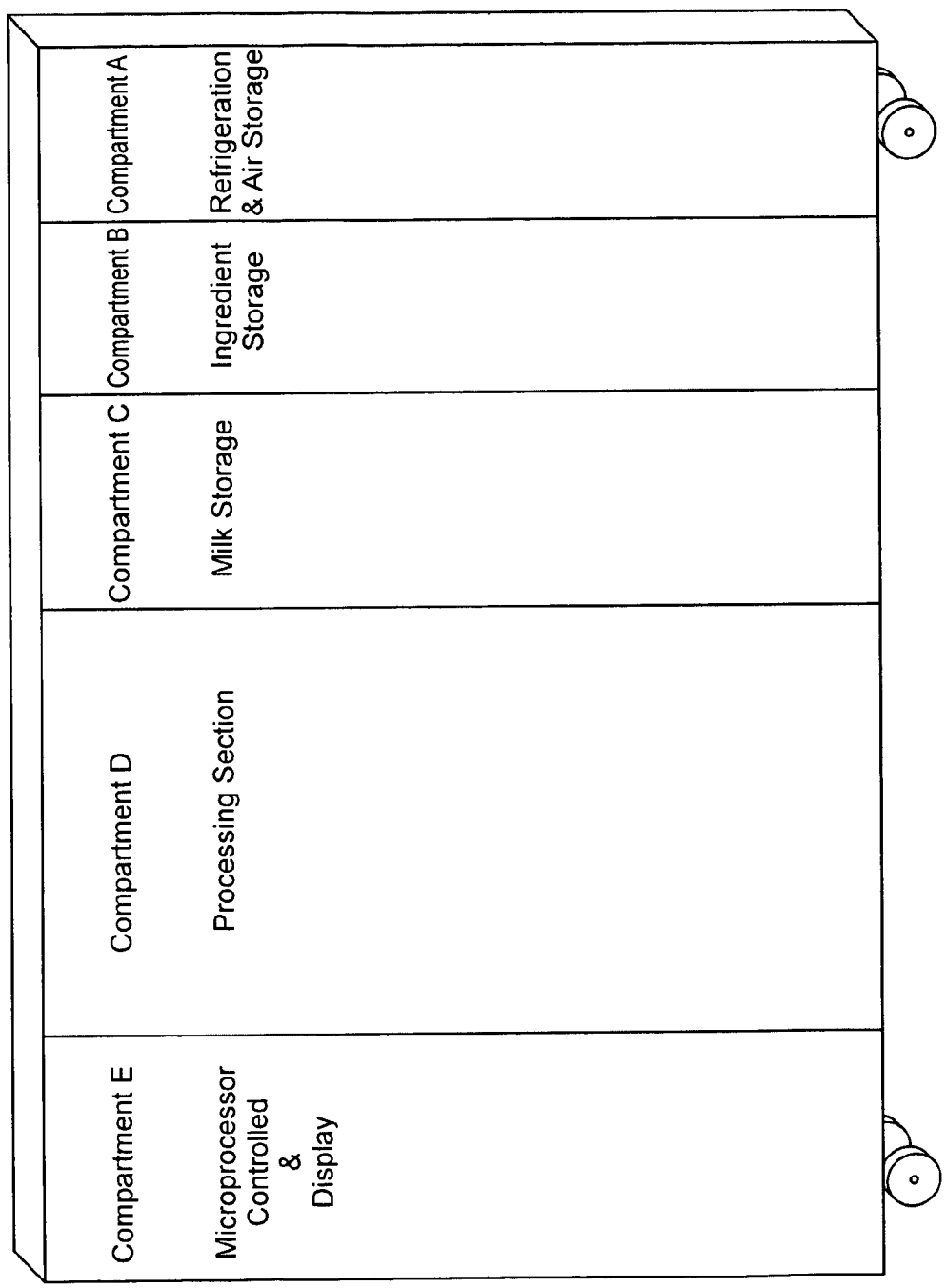

MACHINE FOR MAKING DAIRY PRODUCTS

CROSS REFERENCE

The present application is a continuation-in-part of U.S. application Ser. No. 11/296,189 filed Dec. 6, 2005 which claims priority from provisional application Ser. No. 60/633,504, filed Dec. 6, 2004; provisional application Ser. No. 60/673,154, filed Apr. 20, 2005; and provisional application Ser. No. 60/703,960, filed Jul. 29, 2005, all of which are hereby incorporated by reference herein.

BACKGROUND OF THE INVENTION

With the increasing awareness about personal health, more and more people are looking into readily available nutritious, healthy foods. Yoghurt happens to be one of them and liked by the entire cross section of population irrespective of age and gender of consumers. The consumption of yoghurt has been steadily increasing in the USA as well as worldwide over the years as the life style of working families are changing. Yoghurt prices are also increasing as the cost of processing increases due to the increased cost of energy. Processing of milk to produce yoghurt requires a significant amount of energy and an aseptic processing condition because of direct involvement of live bacterial organisms. Preservation of live bacterial cultures is also an energy intensive process. The conventional yoghurt making process involves use of sugar because the bacterial culture likes to grow in the sugar enriched media present either as dextrose, lactose or sucrose. Artificial sweeteners and nuts can not be used in the conventional process of manufacturing yoghurt using the active culture because the bacteria do not grow well in the presence of artificial sweetener or nuts, especially if lactose-free milk is used. Yoghurt made without any added sugar is very sour.

Often live culture is preferred to supply active cells in the intestine. Stomach bacteria like *Lactobacillus* and other bacteria are also stabilized and improve their growth rate and number in presence of lactic or gluconic acid. Sometimes healthy presence of bifidobacteria like *Lactobacillus* and similar species and particularly in the presence of calcium in the same environment reduces chances of getting stomach and/or colon cancer.

The conventional yoghurt manufacturing takes six to twelve hours to produce, because an active culture of *Lactobacillus* sp. and/or other suitable live culture required fermenting the milk to make the yoghurt. Yoghurt has been produced in the world for centuries, utilizing the active bacterial culture of *Lactobacillus* sp., *Streptococcus* sp., and or combination thereof or other active cultures as inoculum. The conventional yoghurt making process involves incubation of active cultures with milk, sugar, and other solidifying agents and chemicals like phosphates, gelatin, starch, etc., and preservatives at 40-45° C. for 6-12 hours. Heating and holding the milk in this temperature range consumes significant quantities of energy. At the end of the incubation period, the coagulated milk takes the form of yoghurt from milk and the product is saved in the refrigerator at or below 4° C. for future processing or consumption.

The conventional yoghurt making process often requires double pasteurization of the product. In the conventional process, the milk is pasteurized first to deactivate and kill the milk borne naturally occurring bacteria. Yoghurt can be further pasteurized after incubation to kill and deactivate the live bacterial culture before serving. After incubation, the milk is converted to yoghurt and then the yoghurt is pasteurized again for deactivating and killing the active cultures prior to storage at 4° C. Repeated pasteurization processes reduce the nutritional value of milk as well as consume significant amounts of energy to heat and cool the yoghurt for short periods of time. Although the pasteurization process does not kill all the bacteria present in the culture, it significantly reduces the live cell number in the yoghurt. After pasteurization some of the residual live bacterial organisms which came from the active cultures stay alive in the yoghurt. These residual organisms reduce the shelf life of yoghurt and also increase the chances of contamination if the container is left open and not consumed completely when it is opened for consumption.

The yoghurt is sold in the supermarkets under refrigerated conditions. Most yoghurt available in the market contain added artificial flavor, fruit, puree, juices and several other chemicals to maintain the consistency of the product. Several additional chemicals are also added to increase the shelf life of yoghurt. Post pasteurized products are also refrigerated to less than 4° C. to enhance the shelf life. Chemicals like sodium phosphate, sorbitol, glycerine and other chemicals are commonly used to make thicker consistency and longer shelf life. Some of these additives may have animal source as origin of the compound like gelatins. Due to the presence of products of animal origin, vegetarians either by religious practice or lifestyle choice do not consume the products.

Maintenance of pure active bacterial culture is an expensive process also and can be a potential source of contamination if not maintained properly. After addition of all the preservatives, the shelf life of conventional yoghurt still suffers because it still contains a small number of bacteria which eventually can spoil the yoghurt over time even if it is stored at a very low temperature. Transportation of yoghurt is always an expensive process for its subnormal storage temperature requirement. The price of yoghurt could be high in the local store due to increased cost of transportation if it is not manufactured locally. Alternately, beneficial bacteria may be added to the yoghurt after the coagulation step. Adding of the bacteria may be accomplished by adding to the top of the yoghurt.

Glucono-delta-lactone, Glucono-gamma-lactone, Calcium Gluconate, Magnesium Gluconate have been used as food additive for a long time as taste enhancers, preservatives and a significant source of mineral supplements. Glucono-delta-lactone also enhances the growth of probiotic bacterial cultures in the intestine.

SUMMARY OF THE INVENTION

The present invention relates to the use of compounds generally recognized as safe (GRAS) according to regulatory guidelines to make yoghurt instead of needing to use active bacteria culture. Machines of the present invention manufacture freshly made healthy yoghurt in less than an hour or in less than 10 minutes or even in less than three minutes depending upon the characteristics of utilized heating and cooling units. Indeed, machines of the present invention can even be used to serve as a vending machine that could be used for making yoghurt on demand from fresh milk. The machine is capable of delivering yoghurt from any type of milk which includes but not limited to regular milk, homogenized whole milk, skim milk, high fat containing milk like Half & Half (popular in US market), low cream milk, heavy cream milk, low fat milk, soymilk, rice milk, goat milk, sheep milk, lactose free milk and regular milk powder with or without fat. The machine is capable of making the yoghurt with or without the sugar as well as with any artificial sweetener. Depending upon consumer demand, the machine could dispense nuts, freshly cut fruit or cereals on top of the yoghurt or as a mixture.

A vending machine embodiment of the present invention includes a credit entry component for initiating production of a container of the curdled milk, referred to herein as yoghurt. Credit can be entered with cash to a coin mechanism or bill acceptor or the like. Alternatively, a cashless system can be used involving a magnetic card reader, a smart card reader, a wireless receiver, an RFID detector or the like. Responsive to entry of sufficient credit a milk dispenser supplies milk to a container. An ingredient dispenser releases ingredients into the milk to facilitate curdling. A heating unit, such as a microwave unit or electric heating coils, heats the mixture in the container. A cooling unit cools the product for delivery to the purchaser.

The vending machine may more particularly feature a turntable or a conveyor for positioning the container with respect to the milk dispenser. A chute or conveyor may be included for transporting a heated container into the cooling unit. A turntable or a conveyor may be used to transport cooled containers to a capping station. A slide gate beneath the container at the capping station can be used to drop a capped container into a chute for pickup by a purchaser.

More generally, machines of the present invention may manufacture the yoghurt in greater quantities. The machines include a milk dispenser, an ingredient dispenser, a heating unit and a cooling unit. The ingredients, more particularly, include at least one salt of a non-toxic divalent cation and at least one non-toxic acidulating agent. The salt of a divalent cation may be a chelated mineral. The acidulating agent may be any of lactic acid, hydrochloric acid, phosphoric acid, ascorbic acid, citric acid, malic acid, folic acid, stearic acid, palmitic acid, gluconic acid, glucono-delta-lactone, glucono-gamma-lactone, oxalic acid, and glucobionic acid. The milk may be curdled to a desirable consistency in the heating unit in less than ten minutes or, in a preferred embodiment, less than three minutes.

Other objects and advantages of the invention will become apparent during the following description of the presently preferred embodiments of the invention taken in conjunction with the drawings.

BRIEF DESCRIPTION OF THE DRAWINGS

FIG. 3 is a rearview block diagram of the compartments of the vending machine of FIG. 2.

DETAILED DESCRIPTION OF THE PREFERRED EMBODIMENTS

Figure 1:
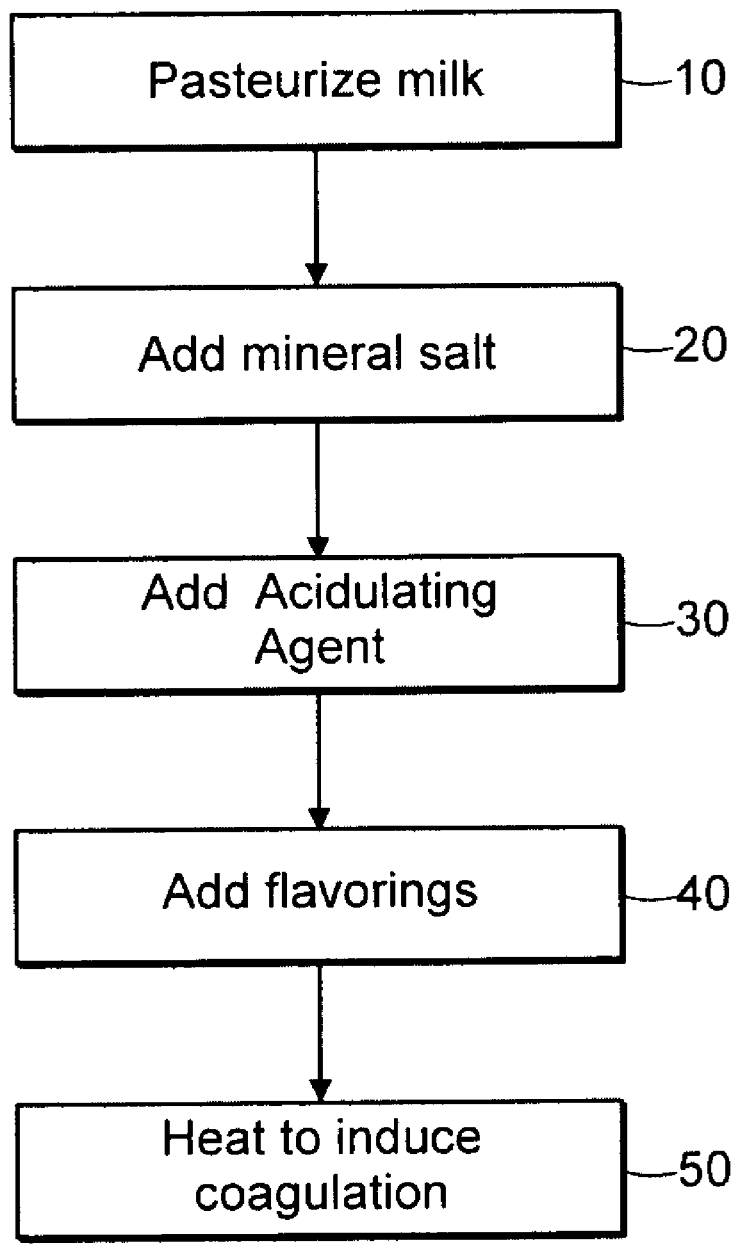
FIG. 1 shows a flow diagram for the process of making yoghurt.

As used herein, the term "yoghurt" is defined as curdled milk. In other words, the protein in the milk has coagulated making a curdled milk product that is typically eaten with a spoon. Unlike heavily curdled cheese products such as cottage cheese, yoghurt is typically a continuous gel with a smooth mouthfeel. The terms "curdling" and "coagulation" describe the process of causing a gellation of the milk to produce a yoghurt.

Machines of the present invention use an improved method for producing yoghurt starting from milk of any type or grade, with or without the use of an active bacterial culture, utilizing an ingredient mixture and a coagulation step. The process can replace or reduce the requirement of the active cell culture.

The methods reduce the time necessary to produce the finished yoghurt.

Methods produce yoghurt starting with any type of milk, with or without using an active culture, requiring less than one hour to produce the finished yoghurt, ready for consumption. Yoghurt made in accordance with embodiments of the present invention without active cultures can stay fresh for a day or two without refrigeration because of the absence of bacteria in the product. Of course, the yoghurt may also be preserved by refrigeration or made into a frozen dairy product. The absence of bacteria makes it possible to include nuts in a shelf-stable yoghurt.

The methods can prepare low fat, low or no sugar, low calorie content yoghurt with or without the use of active culture. More than half of the current population looks for low calorie healthy food to avoid becoming obese. These methods use less energy for processing, no/or very little active bacterial culture and produce longer lasting yoghurt in shelves. The ingredients used supply essential nutrients for bifidobacteria in the stomach and also essential minerals to prevent calcium loss of individuals. This is also a much more economic and comprehensive process to make yoghurt of any type.

In embodiments that do not use any active cultures in this process, the yoghurt manufacturing operation eliminates the double pasteurization of milk. As a result, the essential nutrients present in the milk or added as essential nutrients, like vitamins for supplementation purposes, stay in solution without degradation due to the elimination of the repeated heating and cooling cycles of conventional process. Yoghurt made without active cultures can stay fresh for a day or two without refrigeration because of the absence of bacteria in the product. Of course, the yoghurt may also be preserved by refrigeration or made into a frozen dairy product. The finished product may be stored under refrigeration, with a shelf life of up to 3 months in a controlled atmosphere.

Approximately, 2.9 billion pounds of yoghurt was sold in the USA in 2003 and five times that quantity was consumed in the rest of the world in the same year. A few trillion BTU's of energy could be saved by not processing the milk at elevated temperature for the 6 to 12 hour period. This significant energy saving feature of our invention will contribute a considerable improvement to processed dairy foods industry, particularly yoghurt. Alternately, bacteria can be added at any stage of the manufacturing process either with, or without culturing.

Yoghurt can be made starting from milk of any type or grade, utilizing a mixture of ingredients that facilitates curdling of milk. In various embodiments, milk is mixed with coagulation control ingredients which may include one or more non-toxic divalent cations and at least one non-toxic acidulating agent, and subjected to a denaturing process sufficient to create a gelled yoghurt composition but insufficient to create a non-uniform cheese-like composition. Coagulation control agents are typically used at concentrations of 1-10%. A desired consistency of the yoghurt can be achieved in preferred embodiments without use of any individually or together of starch, gelatin, diglyceride or other thickener. Additional flavoring and nutritional ingredients may be added either prior to or subsequent to the coagulation step.

The milk may be any type of milk, for example, homogenized whole milk, skim milk, low fat milk, lactose-free milk, soy milk, rice milk, goat milk, or sheep milk. The milk may be pasteurized or un-pasteurized The milk may be reconstituted from a concentrate or powder. As used herein, milk refers to any of these or similar beverages that will coagulate into yoghurt in the presence of heat and coagulation control ingredients such as an acidulant and a cationic mineral.

The mineral salt is chosen for its ability to preserve the gel-like structure of the milk proteins upon coagulation and to be either non-toxic or to provide a health-enhancing benefit. The mineral salt may include a divalent metal cation. Chelated minerals such as calcium and magnesium chelates are known to provide a highly soluble source of cations and have known health benefits. Examples of suitable metal chelates include calcium gluconate and magnesium gluconate. Metal ion concentrations are typically in the range 1-2%. Some examples of suitable mineral salts include calcium lactate, calcium acetate, calcium citrate, calcium malate, calcium carbonate, calcium borogluconate, calcium gluconate, calcium chloride, calcium phosphate, calcium sulfate, calcium succinate, calcium ascorbate, calcium folate, calcium stearate, calcium glucobionate, calcium palmitate and magnesium gluconate.

The acidulating agent is chosen to be non-toxic, and non-detrimental to taste. The amount of acidulating agent needed varies depending on the strength of the acid (pKa) but is typically sufficient to lower the pH of the milk to less than 7 and preferably between 4.5 and about 6.6. Some examples of suitable acidulating agents include lactic acid, hydrochloric acid, phosphoric acid, ascorbic acid, citric acid, malic acid, folic acid, stearic acid, palmitic acid, gluconic acid, glucono-delta-lactone, glucono-gamma-lactone, oxalic acid, or glucobionic acid. Lactones act as acidulating agents after hydrolysis to yield carboxylic acids. The acidulating agent may be added in a quantity that typically reduces the pH of the milk to about 5 to 6.5.

The coagulation conditions are chosen to be sufficient to create a gelled yoghurt product but insufficient to create harder or more inhomogeneous cheese-like products. The coagulation process involves denaturation of proteins and excessive denaturation will cause the protein to separate from the aqueous phase and settle out. Therefore, any denaturation process must be carefully timed or controlled to create a gelled product. Coagulation is usually initiated through heating, but other coagulation processes such as elevating hydrostatic pressure to above 1 kbar could also be used. The rate of heating is dependent on the scale of the process and may include stirring during part or all of the heating process. Heating of individual servings of yoghurt can be performed quickly and may be performed in a plastic-cup packaging with a lid, but a 1000 liter process will take longer and require extra care to not create zones of heating that exceed the desired range. Typical temperature conditions for the denaturation step are in the range of 40° C. and 90° C. for 1-120 minutes, and could advantageously be between 50° and 85° C. for 3-60 min. Temperature and times may be chosen to give quick results, for example heating one cup of milk with coagulation control ingredients for 75° C. for 5 minutes. Alternatively, conditions may be chosen to give a slower coagulation which may be more conducive to a more uniform product or to a robust and economical manufacturing process. For example, the milk with coagulation control ingredients may be heated to between 55-60° C. for 60 minutes. The coagulation step may include monitoring to determine when the desired consistency is reached. After heating, the mixture is cooled and may be consumed immediately or packaged, shipped and stored on the shelf of a retail store.

The coagulation step may further serve as a microbial inactivation step, thereby extending the shelf life of the product. In some instances this may be the only heat-based microbial inactivation step or even the only microbial inactivation step. If the coagulation process is used as the only inactivation step, it may be desirable to perform the process for a longer period of time or at the high end of the desired temperature range, for example 90° C., for a shorter period. Care must be taken, however, to not over-curdle the milk.

The coagulation process may be performed in batch or continuous modes. In certain embodiments, the heating step is performed as a batch process in the final packaging such as a cup or squeeze-tube and is performed quickly, for example in no more than 10 minutes. The uncurdled milk may be mixed with gelling agents such as a mineral salt and an acidulating agent and with flavorings, sweeteners and other desired ingredients, which may include nuts, packaged, and then heated to induce curdling. The package may be hermetically sealed prior to the heating step. Without limitation the heating process may involve placing the packaged product on a conveyer belt that moves the package through a heated delay line, the milk being gelled upon exit from the heated delay line. Alternatively, individual servings or groups of individual servings may be packaged together in cartons, crates or other containers and placed in a heated chamber for a defined period of time and removed either manually or automatically. The heating step might also be performed as a continuous process in a heated tube, but this would cause a pressure differential across the tube and may affect the properties of the product upon exit from the tube and into the packaging. Heating may be performed with the use of microwaves, including at home in a microwave oven.

The additional flavoring agents which may be added either before or after coagulation include whole or chopped nuts, fruits, juices, purees, condiments or other foodstuffs, natural or artificial sweeteners, flavorings, colorings, vitamins, additional minerals, or numerous additives typically used with dairy or other foods. If nuts are used, they may be whole, chopped or otherwise cut up. The nuts may be raw, roasted or otherwise processed. Any nuts may be used including but not limited to walnuts, peanuts, almonds, pecans, pistachios, macadamia nuts or cashews. Examples of sweeteners that can be used alone or in combination include without limitation: sucrose, glucose, sucralose, saccharin, aspartame, cyclamates, neotame, acesulfame, xylitol, sorbitol, maltitol, mannitol, tagatose, trehalose, maltose, Stevia, barley malt, evaporated cane juice, fruit juices, rice syrup, honey, licorice root, amasake, molasses, brown sugar invert sugar, lactose, maple syrup, turbinado sugar, fructo-oligosaccharides or sweet proteins such as thaumatin, brazzein, monelin, curculin, mabinlin, miraculin or pentadin. In typical embodiments, the yoghurt is made with added fruit and sugar or other sweetener.

Because the process may be performed at a relatively high pH the end product often does not have a sour taste and may require no sweetener at all, or only fruit as a sweetener. For example, the pH could be controlled to be 6.5 and only blueberries added to the yoghurt either before or after the coagulation step. The fruit could be added to the cup prior to introducing the pre-curdled milk or curdled yoghurt to give a fruit-on-the-bottom yoghurt.

With reference to the embodiment presented in FIG. 1, raw milk is pasteurized (10), then a mineral salt, an acidulating agent is added and flavorings including sweeteners are added (20, 30, 40). The mineral salt, acidulating agent and flavorings could be added in any order or at the same time and may be stirred or otherwise blended. The mixture is then heated to coagulate the product (50) into a curdled yoghurt.

The yoghurt may be packaged either prior to or after coagulation and the packaged product may include nuts. The packaging may include a cup with a lid, a squeeze-tube or any other packaging suitable for yoghurt. The packages may be grouped together in cartons or crates and shipped in refrigerated containers for distribution to grocery stores for sale. The yoghurt is shelf stable and so may be distributed economically and reliably.

Although the yoghurt may be made without adding bacteria, some consumers may favor a product with added bacteria for its purported health benefit. To satisfy these consumers, bacteria may be added onto the yoghurt after the curdling process. The bacteria may be added by spraying a solution or dispensing a powder onto the yoghurt. The bacteria could be mixed into the curdled yoghurt, but this would disrupt the gel structure.

Milk may be mixed with coagulation control ingredients and sold to consumers, or to food retailers such as restaurants to be heated when they desire to make yoghurt. Such a pre-mixed yoghurt precursor may be sold in microwave-safe containers for coagulation in microwave ovens.

An added benefit in favor of the use of this yoghurt making method is based upon recent medical journal publications, which reveal that calcium intake in the stomach leads to reducing rectal and colon cancer. The inclusion of a calcium derivative in the yoghurt is thus beneficial. Calcium may be in the form of calcium gluconate, calcium acetate, calcium lactate, calcium chloride or calcium carbonate. Presence of gluconate derivatives in this process of manufacturing yoghurt enhances the growth of the natural bifidobacteria present in intestines of human beings and also bacterial organisms present in active cultures if added externally as a supplement.

Example-1

Yoghurt with High Fat Containing Milk 3.5 gm of Calcium Gluconate, 2 gm of glucono-delta-lactone and 1 gm of Magnesium Gluconate was added into 240 ml (approximately 8 oz) of half & half milk/cream mixture in a glass beaker. 20 grams of sucrose was added to sweeten the milk mixture. The milk mixture was stirred gently to dissolve the contents. After completely dissolving the solids in the milk mixture the glass beaker was heated to no more that 75° C. for 7-10 minutes. The mixture was then allowed to cool in room temperature. The mixture appears to be solid visually; the glass beaker was closed and stored inside the regular refrigerator maintained at 4° C. temperature. After overnight storage the solid curdled mixture was taken out from the refrigerator and tasted for its quality and appearance. The product was tasty with no bad odor or sourness on tongue. The product was stored in the refrigerator for six weeks and no contamination was detected after six weeks. Consistency of the product appeared to be thick and not free flowing on shaking.

Example-2

Yoghurt with Reduced Fat Milk 2 gm of Magnesium Gluconate, 1.5 gm of Calcium Acetate and 3 gm of Glucono-gama-lactone were mixed together with 20 grams of common table sugar. Solid mixture was added to 250 ml of 2% fat milk in a glass container. The mixture was heated over a magnetic stirrer/heater for 5-13 minutes, more precisely less than 10 minutes between 60° C.-75° C. by turning on and turning off the power supply of the stirrer/heater. After 10 minutes the glass beaker was removed from the stirrer/heater, closed its top opening and left at room temperature allowing it to cool to ambient temperature. The mixture was stored in refrigerator for 4 weeks. After 4 weeks the curdled milk was tasted for its visual appearance and taste, both appeared to be acceptable. pH of the product was under 5.8.

Example-3

Yoghurt with Fat Free Milk 2.5 gm of Calcium Gluconate, 1.5 gm of Glucono-delta-lactone mixed with 240 ml of fat free milk and 20 gm of sucrose mixed together in magnetic mixer and heated between 62° C.-75° C. for five minutes. The mixture was checked for its pH and found to be 6.4. The curdled mixture was stored in a refrigerator for 48 hours. The curdled mixture was tested for its consistency, taste, color and texture. The product texture appeared to be less solid. The taste of yoghurt appeared to be acceptable with no off odor, color or pungency.

Example-4

Yoghurt with Artificial Sweetener 3.5 gm of Calcium Chloride, 0.5 gm of Calcium Acetate, and 3 gm of Glucono-delta-lactone and 2 packs of the artificial sweetener sucralose containing 1 gram of sweetener was added to 480 ml of whole milk, and mixed thoroughly until all the components were dissolved in the milk. The mixture was then heated with stirring using a magnetic stir-bar for 5-7 minutes between 60° C. and 80° C. The coagulated mixture was allowed to cool at room temperature; the container was closed and stored in a refrigerator for 48 hours. Refrigerated yoghurt was tasted for texture, consistency and color and appeared to be acceptable. pH of the curdled milk was found to be under 6.6. The curdled mixture was stored in the refrigerator for another 8.5 weeks and found later to have no deterioration in acceptability.

Example-5

Yoghurt with Lactose Free Milk 2.5 gm of Calcium Gluconate and 1.5 gm of Glucono-delta-lactone mixed with 240 ml of lactose-free milk and 2 packs of Sweet' N Low® brand saccharin mixed together in magnetic mixer and heated between 62° C.-75° C. for five minutes. The mixture was checked for its pH and found to be 6.5. The curdled mixture was stored in a refrigerator for 48 hours. The curdled mixture was tested for its consistency, taste, color and texture. The product texture appeared to be less solid. The taste of the yoghurt appeared to be acceptable with no off odor, color or pungency. The product was stored in a refrigerator for 9 weeks and tasted for consistency and found to be acceptable.

Figure 2:
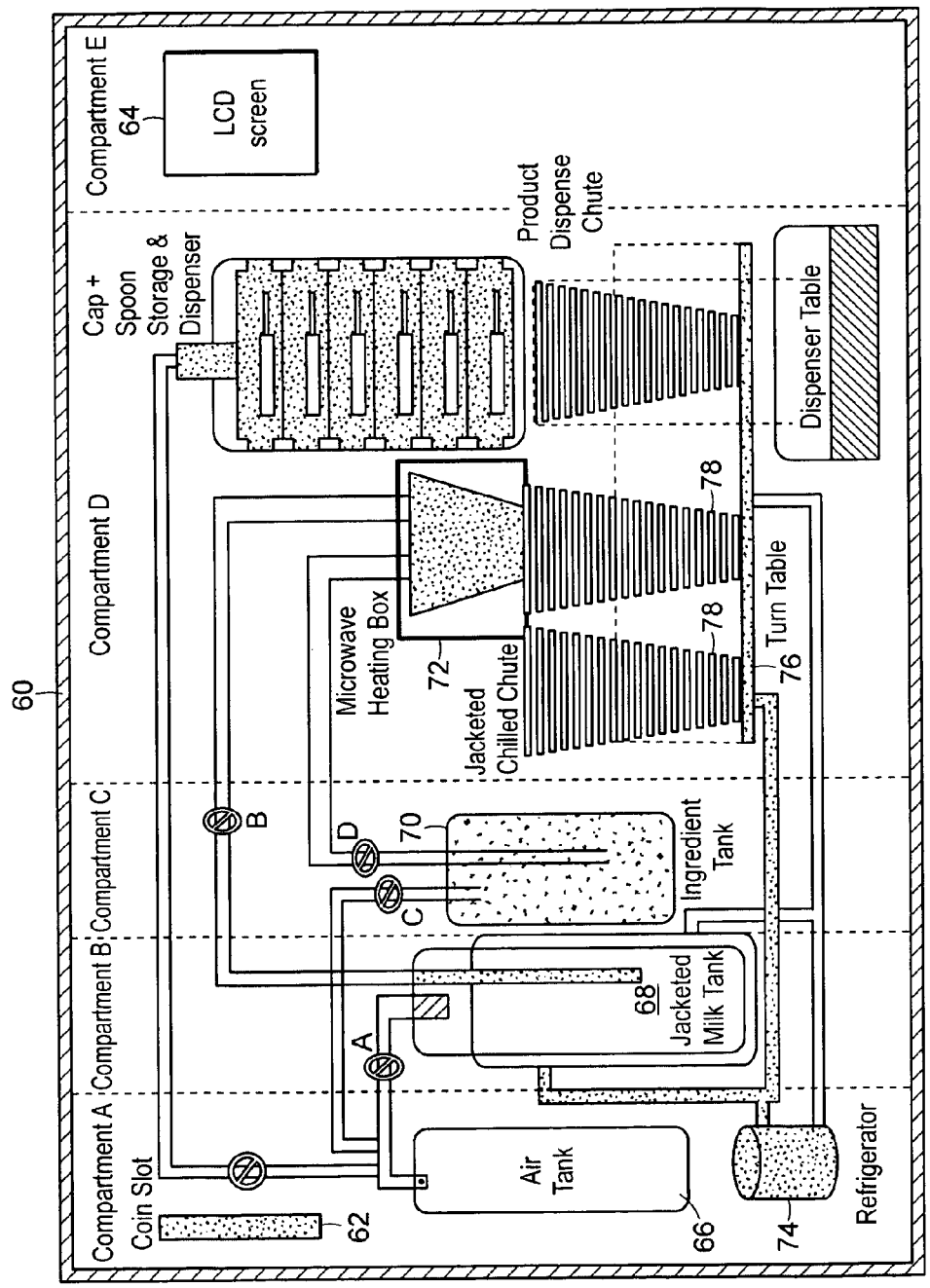
FIG. 2 is a diagram of a vending machine embodiment of the present invention for making yoghurt.

Referring now to FIG. 2, a vending machine embodiment of the present invention is illustrated. The vending machine 60 includes a credit entry component. Credit may be entered through a coin slot 62, a bill receiver or using a cashless method. Payment is verified using conventional equipment to analyze the coins received, to analyze the bills or to electronically debit an account. Thus, the credit entry component may be a coin mechanism, a bill acceptor or a cashless device. A variety of cashless credit entry components are possible for incorporation into the vending machine. For example, such components include a magnetic card reader, a wireless receiver or an RFID detector. The yoghurt making process begins in the machine upon verifying payment. An automatic cycle timer activates the machine to prepare a finished container of fresh yoghurt within three minutes.

The vending machine may be provided with a color LCD display screen 64. The display may give a progress report as the manufacture proceeds from one activity to the next. The customer thus remains informed of the progress as the yoghurt is awaited.

A six liter stainless steel air cylinder 66, designed for 30 to 50 psig operation may be located in a first compartment "A" of the machine along with the credit entry component. At the start, solenoid valve "A" is opened in the air cylinder outlet tube, to allow air to flow from the air cylinder to a jacketed milk tank 68 in compartment "B." When the pressure in the tube reaches a preset amount a limit switch on solenoid valve "A", (open position), triggers solenoid valve "C" to allow air to flow from the air cylinder, to the 500 cc stainless steel ingredient reservoir 70. The ingredients will include a salt of non-toxic divalent cation and a non-toxic acidulating agent. Additional ingredients may be included as well. Ingredients may be maintained in the reservoir as a powder so long as the reservoir is kept dry. Ingredients in a different form such as a fruit syrup, compote or liquid may require a second ingredient reservoir so that such additional ingredients could also be directed into the container of milk before or after the heating process. Optional ingredients may also use a separate ingredient reservoir to give purchasers an ability to choose additives such as vitamins, fruit, nuts or cereal. With the milk tank and ingredient tank primed, a limit switch in valve "C" detects the pressure level and triggers the solenoid valve "D" to open. This allows ingredients to flow from the reservoir in compartment "C" to the empty plastic container located in the heating unit 72. In an alternate embodiment, the milk tank can hold water instead of milk and the ingredient tank can include powdered milk. A suitable heating unit may be a microwave heating box as shown or an oven with electric heating coils or other known heater. A 900 watt microwave unit should provide accelerated curdling of the milk in less than three minutes. In the embodiment of FIGS. 2 and 3, the heating unit 72 is located in compartment "D." The product container is sitting on a disc and donut type seat, with the seat closed above the jacketed draft tube in compartment "D." The disc and donut seat is fixed at the perimeter to a load cell sitting in the compartment "D", adjacent to the container.

As soon as the load cell detects that a sufficient amount of ingredient has been charged to the container, solenoid valve "D" is closed, and with the solenoid "D" in the closed position, and load cell reading that the correct amount of material is in the cup, solenoid valve "B", located in the milk reservoir outlet tube is opened to allow the desired amount of milk to flow from the milk reservoir 68 to the container. The milk reservoir 68 is a jacketed stainless steel tank, designed with a refrigeration system 74 to maintain the milk contents below room temperature.

When the load cell reads that the correct amount of milk is in the container, the solenoid valve "B" is closed, and when limit switch on "B" closed is contacted, solenoid valve "A" is closed isolating the air supply to the milk reservoir, and ingredient reservoir. A temperature sensing element, such as an ultrasonic temperature sensor, detects the desired temperature between 60 and 90 degrees C. and within minutes; the machine is ready for the next step.

The electronic circuitry system checks to determine that all solenoid valves are closed, the load cell reading is correct, and the container is at the desired temperature. At that point the disc, on the disc and donut valve, flaps down and the spring actuated slide gate valve, located below the disc and donut valve is slid back to allow the heated container containing the heated yoghurt mixture to gravitate down, into the refrigeration zone, through a jacketed draft tube arrangement, down to the base plate, which is located on a turntable 76. The turntable 76 and draft tube 78 are both jacketed and controlled to maintain temperatures of the refrigerant in the jacket below 8° C.

At the base of the draft tube 78, another temperature sensing element monitors cooling of the yoghurt. The jacketed portion of the draft tube extends to about six inches from the bottom, at which point it is just a plain metal wall. A slotted sleeve is used on the bottom six inch section of the tube, and is opened by a switch activated by the temperature sensing element, when the container contents reach the correct cool temperature. The turntable 76 on the base of the draft tube, revolves, to move the full container to a location above the product drop chute, and places a new empty container, into the base of the draft tube.

With the full cooled container above the product drop chute in place, a cap inserter places a cap and spoon on to the top of the container, and the container is thus sealed off at the top. Caps are conveniently provided with spoons attached to their top for a single placement together onto the container. At this point the product is ready to be delivered. The cap inserter triggers a slide gate located below the container, and above the drop chute to open, and to allow the finished sealed container of fresh yoghurt to drop into the chute. The color LCD screen 64 announces that the fresh yoghurt is ready for pickup, by the purchaser—all in about 3 minutes from the time the payment was received to the end of the cycle.

With the empty container at the base of the draft tube in the ready position for lift off, the electronic system checks to verify that both the upper slide gate valve, and disc and donut flapper valve, located above the draft tube are still opened. A lift element, at the base of the draft tube, lifts the empty container into the microwave oven, making the container ready for the next cycle. A limit switch which detects the empty container in the ready position, triggers the disc and donut flapper valve to close, and the slide gates above, both the draft tube, and product drop chute are returned to the closed position. The vending machine is ready for immediate use by the next product request.

It is anticipated that on the average of 15 cups of yoghurt consumption per day from the machine, it will be necessary to have a serviceman check the machine about once per week, in order to replenish the supply of empty containers and caps, ingredients, air in the cylinder, and milk, etc. The master control system inside the vending machine 60 is designed to set off an alarm system at a specified phone contact number, in the event a malfunction has occurred or, any of the necessary supplies in the vending machine have been used up sooner than expected.

The production methods of yoghurt described above may be used in mass manufacturing machines. Such a manufacturing system includes a milk dispenser for releasing milk into a container. An ingredient dispenser system releases at least one salt of a non-toxic divalent cation and at least one non-toxic acidulating agent into the container. This may be repeated for each container carried along by a conveyor. A heating unit curdles the milk mixed with the ingredients. In preferred embodiments, the desired curdling is completed in less than one hour. A cooling unit cools the contents of the container. The desired consistency can be achieved in preferred embodiments without addition of thickener such as any or all of starch, diglyceride or gelatin.

Although the invention has been described with reference to numerous embodiments, it will be understood by one of ordinary skill in the art that various modifications may be made without departing from the spirit and the scope of the invention, as set forth in the claims herein below.

We claim:

1. A vending machine comprising:
   a credit entry component;
   a milk dispenser that supplies milk to a container responsive to entry of a sufficient credit;
   an ingredient dispenser system arranged for releasing two or more ingredients to facilitate curdling of milk into the container;
   a heating unit for heating the mixture of milk and ingredients in the container;
   a cooling unit for cooling the container and its contents; and
   a conveyor for transporting the cooled container to a capping station.

2. The vending machine of claim 1 wherein the credit entry component comprises a coin mechanism.

3. The vending machine of claim 1 further comprising a turntable for delivering an empty container into position for receiving milk from the milk dispenser.

4. The vending machine of claim 1 further comprising a conveyor for delivering an empty container into position for receiving milk from the milk dispenser.

5. The vending machine of claim 1 wherein the two or more ingredients comprises at least one salt of a non-toxic divalent cation and at least one non-toxic acidulating agent.

6. The vending machine of claim 5 wherein the at least one salt of a divalent cation comprises a chelated mineral.

7. The vending machine of claim 5 wherein the acidulating agent is selected from the group consisting of: lactic acid, hydrochloric acid, phosphoric acid, ascorbic acid, citric acid, malic acid, folic acid, stearic acid, palmitic acid, gluconic acid, glucono-delta-lactone, glucono-gamma-lactone, oxalic acid, and glucobionic acid.

8. The vending machine of claim 1 wherein the heating unit comprises a microwave box.

9. The vending machine of claim 1 wherein the heating unit comprises electric heating coils.

10. The vending machine of claim 1 further comprising a chute for dropping a heated container from the heating unit to the cooling unit for cooling the container.

11. The vending machine of claim 1 further comprising a conveyor for transporting a heated container from the heating unit to the cooling unit for cooling the container.

12. The vending machine of claim 1 further comprising a slide gate beneath the container at the capping station, the slide gate being released after the container has been capped so as to drop the capped container into a chute for pickup by a purchaser.

13. The vending machine of claim 1 further comprising a slide gate beneath the container at the capping station, the slide gate being released after the container has been capped so as to drop the capped container into a chute for pickup by a purchaser.

14. A machine for rapid production of yoghurt comprising:
   a milk dispenser arranged for releasing milk into a container;
   a conveyor for delivering an empty container into position for receiving milk from the milk dispenser;
   an ingredient dispenser system arranged for releasing at least one salt of a non-toxic divalent cation and at least one non-toxic acidulating agent into the container;
   a heating unit for curdling the milk mixed with the ingredient by heating the contents for less than one hour; and
   a cooling unit for cooling the contents of the container.

15. The machine of claim 14 wherein the salt of a divalent cation comprises a chelated mineral.

16. The machine of claim 14 wherein the acidulating agent is selected from the group consisting of: lactic acid, hydrochloric acid, phosphoric acid, ascorbic acid, citric acid, malic acid, folic acid, stearic acid, palmitic acid, gluconic acid, glucono-delta-lactone, glucono-gamma-lactone, oxalic acid, and glucobionic acid.

17. The machine of claim 14 wherein the heating unit comprises a microwave box.

18. The machine of claim 14 wherein the heating unit comprises electric heating coils.

19. The machine of claim 14 further comprising a chute for dropping a heated container from the heating unit to the cooling unit for cooling the container.

20. The machine of claim 14 further comprising a conveyor for transporting a heated container from the heating unit to the cooling unit for cooling the container.

21. The machine of claim 14 further comprising a cap transporter for providing caps and a capping station for placing a cap from the cap transporter on the cooled container.

22. The machine of claim 21 further comprising a turntable for transporting the cooled container to the capping station.

23. The machine of claim 21 further comprising a conveyor for transporting the cooled container to the capping station.

24. The machine of claim 14 wherein the milk in the container is curdled in the heating unit in less than ten minutes.

25. The machine of claim 14 wherein the milk in the container is curdled in the heating unit in less than three minutes.

26. A vending machine comprising:
   a credit entry component;
   a milk dispenser that supplies milk to a container responsive to entry of a sufficient credit;
   a turntable for delivering an empty container into position for receiving milk from the milk dispenser;
   an ingredient dispenser system arranged for releasing two or more ingredients to facilitate curdling of milk into the container;
   a heating unit for heating the mixture of milk and ingredients in the container; and
   a cooling unit for cooling the container and its contents.

27. A vending machine comprising:
   a credit entry component;
   a milk dispenser that supplies milk to a container responsive to entry of a sufficient credit;
   an ingredient dispenser system arranged for releasing two or more ingredients to facilitate curdling of milk into the container;
   a microwave box for heating the mixture of milk and ingredients in the container; and
   a cooling unit for cooling the container and its contents.

28. A vending machine comprising:
   a credit entry component;
   a milk dispenser that supplies milk to a container responsive to entry of a sufficient credit;
   an ingredient dispenser system arranged for releasing two or more ingredients to facilitate curdling of milk into the container;
   a heating unit for heating the mixture of milk and ingredients in the container;
   a cooling unit for cooling the container and its contents; and
   a chute for dropping a heated container from the heating unit to the cooling unit.

29. A vending machine comprising:
a credit entry component;
a milk dispenser that supplies milk to a container responsive to entry of a sufficient credit;
a conveyor for delivering an empty container into position for receiving milk from the milk dispenser;
an ingredient dispenser system arranged for releasing two or more ingredients to facilitate curdling of milk into the container;
a heating unit for heating the mixture of milk and ingredients in the container; and
a cooling unit for cooling the container and its contents.

30. A vending machine comprising:
a credit entry component;
a milk dispenser that supplies milk to a container responsive to entry of a sufficient credit;
an ingredient dispenser system arranged for releasing two or more ingredients to facilitate curdling of milk into the container;
a heating unit for heating the mixture of milk and ingredients in the container;
a cooling unit for cooling the container and its contents; and
a conveyor for transporting a heated container from the heating unit to the cooling unit.

31. A vending machine comprising:
a credit entry component;
a milk dispenser that supplies milk to a container responsive to entry of a sufficient credit;
an ingredient dispenser system arranged for releasing two or more ingredients to facilitate curdling of milk into the container;
a heating unit for heating the mixture of milk and ingredients in the container;
a cooling unit for cooling the container and its contents; and
a turntable for transporting the cooled container to a capping station.

32. A machine for rapid production of yoghurt comprising:
a milk dispenser arranged for releasing milk into a container;
a turntable for delivering an empty container into position for receiving milk from the milk dispenser;
an ingredient dispenser system arranged for releasing at least one salt of a non-toxic divalent cation and at least one non-toxic acidulating agent into the container;
a heating unit for curdling the milk mixed with the ingredient by heating the contents for less than one hour; and
a cooling unit for cooling the contents of the container.

33. A machine for rapid production of yoghurt comprising:
a milk dispenser arranged for releasing milk into a container;
an ingredient dispenser system arranged for releasing at least one salt of a non-toxic divalent cation and at least one non-toxic acidulating agent into the container;
a microwave box for curdling the milk mixed with the ingredient by heating the contents for less than one hour; and
a cooling unit for cooling the contents of the container.

34. A machine for rapid production of yoghurt comprising:
a milk dispenser arranged for releasing milk into a container;
an ingredient dispenser system arranged for releasing at least one salt of a non-toxic divalent cation and at least one non-toxic acidulating agent into the container;
a heating unit for curdling the milk mixed with the ingredient by heating the contents for less than one hour;
a cooling unit for cooling the contents of the container; and
a chute for dropping a heated container from the heating unit to the cooling unit.

35. A machine for rapid production of yoghurt comprising:
a milk dispenser arranged for releasing milk into a container;
an ingredient dispenser system arranged for releasing at least one salt of a non-toxic divalent cation and at least one non-toxic acidulating agent into the container;
a heating unit for curdling the milk mixed with the ingredient by heating the contents for less than one hour;
a cooling unit for cooling the contents of the container; and
a conveyor for transporting a heated container from the heating unit to the cooling unit.

36. A machine for rapid production of yoghurt comprising:
a milk dispenser arranged for releasing milk into a container;
an ingredient dispenser system arranged for releasing at least one salt of a non-toxic divalent cation and at least one non-toxic acidulating agent into the container;
a heating unit for curdling the milk mixed with the ingredient by heating the contents for less than one hour;
a cooling unit for cooling the contents of the container;
a cap transporter for providing caps; and
a capping station for placing a cap from the cap transporter on the cooled container.

* * * * *